(12) United States Patent
Callan

(10) Patent No.: US 8,855,500 B2
(45) Date of Patent: Oct. 7, 2014

(54) CHANNEL POWER CONTROL IN AN OPTICAL LINK

(75) Inventor: Paul Alexander Callan, Loughborough (GB)

(73) Assignee: Telefonaktiebolaget LM Ericsson, Stockholm (SE)

( * ) Notice: Subject to any disclaimer, the term of this patent is extended or adjusted under 35 U.S.C. 154(b) by 305 days.

(21) Appl. No.: 13/121,274

(22) PCT Filed: Oct. 3, 2008

(86) PCT No.: PCT/EP2008/063271
§ 371 (c)(1),
(2), (4) Date: Jun. 13, 2011

(87) PCT Pub. No.: WO2010/037423
PCT Pub. Date: Apr. 8, 2010

(65) Prior Publication Data
US 2011/0243555 A1    Oct. 6, 2011

(51) Int. Cl.
*H04B 10/00*  (2013.01)
*H04J 14/02*  (2006.01)
*H04B 10/296*  (2013.01)

(52) U.S. Cl.
CPC ............................. *H04J 14/0221* (2013.01); *H04B 10/296* (2013.01)
USPC ........................................ 398/173; 398/177

(58) Field of Classification Search
USPC .................................................. 398/173–181
See application file for complete search history.

(56) References Cited

U.S. PATENT DOCUMENTS

| 6,207,949 | B1 * | 3/2001 | Jackel ...................... 250/227.24 |
| 6,304,347 | B1 * | 10/2001 | Beine et al. ...................... 398/38 |
| 6,535,330 | B1 * | 3/2003 | Lelic et al. ............... 359/337.13 |
| 6,600,594 | B1 * | 7/2003 | Ko et al. ........................ 359/337 |
| 6,687,045 | B2 * | 2/2004 | Lelic .......................... 359/337.1 |
| 6,865,016 | B2 * | 3/2005 | Sugaya et al. ............. 359/337.1 |
| 6,987,922 | B2 * | 1/2006 | Bierman et al. .............. 385/140 |
| 7,139,118 | B2 * | 11/2006 | Griggs et al. .............. 359/337.1 |
| 7,208,722 | B2 * | 4/2007 | Goto et al. ............... 250/227.23 |
| 7,224,515 | B2 * | 5/2007 | Fourte et al. .............. 359/337.1 |

(Continued)

FOREIGN PATENT DOCUMENTS

| DE | 199 40 818 | 3/2001 |
| GB | 2 411 044 | 8/2005 |
| WO | WO 2005/122445 | 12/2005 |

OTHER PUBLICATIONS

International Search Report for PCT/EP2008/063271, mailed Jun. 4, 2009.

(Continued)

*Primary Examiner* — Agustin Bello
(74) *Attorney, Agent, or Firm* — Nixon & Vanderhye, P.C.

(57) ABSTRACT

Methods and apparatus for control of variable optical attenuators are described. A method for control of a variable optical attenuator located in an optical link comprising a plurality of optical attenuators. The method comprises determining that an initial calibration step of a variable optical attenuator has been completed, and transmitting a signal indicative of the variable optical attenuator having completed the initial calibration step for receipt by a downstream variable optical attenuator. A method of controlling a variable optical attenuator comprises receiving a signal indicative of an upstream variable optical attenuator having completed an initial calibration step, and initiating calibration of the variable optical attenuator in response to receipt of said signal.

20 Claims, 4 Drawing Sheets

(56) References Cited

U.S. PATENT DOCUMENTS

| | | | |
|---|---|---|---|
| 7,343,102 B2* | 3/2008 | Tomofuji et al. | 398/160 |
| 7,619,813 B2* | 11/2009 | Maeda et al. | 359/341.42 |
| 8,077,384 B2* | 12/2011 | Mori | 359/341.42 |
| 2001/0017729 A1* | 8/2001 | Sugaya et al. | 359/341.41 |
| 2002/0071173 A1* | 6/2002 | Lee et al. | 359/337.1 |
| 2004/0109662 A1 | 6/2004 | Scarth et al. | |
| 2004/0208538 A1* | 10/2004 | Liwak | 398/45 |
| 2005/0111667 A1* | 5/2005 | Vig et al. | 380/278 |
| 2005/0168806 A1* | 8/2005 | Maeda et al. | 359/341.4 |
| 2006/0077534 A1* | 4/2006 | Griggs et al. | 359/337 |
| 2006/0124842 A1* | 6/2006 | Goto et al. | 250/227.23 |
| 2006/0269284 A1* | 11/2006 | Fujita | 398/38 |
| 2008/0292095 A1* | 11/2008 | Vig et al. | 380/2 |
| 2011/0176802 A1* | 7/2011 | Callan | 398/38 |
| 2011/0243555 A1* | 10/2011 | Callan | 398/38 |

OTHER PUBLICATIONS

Richards, D.H. et al., "A Theoretical Investigation of Dynamic All-Optical Automatic Gain Control in Multichannel EDFA's and EDFA Cascades", IEEE Journal of Selected Topics in Quantum Electronics, vol. 3, No. 4, (Aug. 1, 1997), pp. 1027-1036.

* cited by examiner

CHANNEL POWER CONTROL IN AN OPTICAL LINK

This application is the U.S. national phase of International Application No. PCT/EP2008/063271, filed 3 Oct. 2008, which designated the U.S., the entire contents of which is hereby incorporated by reference.

TECHNICAL FIELD

The present invention relates to method and apparatus for controlling the power of a channel in an optical link, including methods and apparatus for controlling the power of a channel in a node of an optical link comprising a plurality of nodes. Embodiments of the present invention are particularly suitable for controlling the power of a channel introduced along an optical link. Embodiments of the present invention are also particularly suitable for, but not limited to, controlling the operation of variable optical attenuators in an Automatically Switched Optical Network (ASON).

BACKGROUND

Wavelength division multiplexing is the transmission of several different signals via a single optical transmission medium (e.g. fibre), by sending each signal ("channel") at a different optical frequency or wavelength. A multiplexer is used to combine the different channels together for transmission, and a demultiplexer is used to separate the channels following transmission. WDM optical transmission systems are typically composed of a number of spans of optical fibre linking together the network nodes.

Early WDM networks used simple, fixed optical filters to route the optical signals between the network nodes. Such networks were therefore essentially "static" i.e. the channel configuration (number of channels being transmitted, and the routing of the channels through nodes of the network) did not change, except during fault conditions or due to human intervention to upgrade or alter the network configuration.

More recent WDM networks can include reconfigurable optical network nodes, which allow remote reconfiguration of the channels, faster provisioning of new channels and improved network resilience. Such reconfigurable optical network nodes commonly employ integrated optical devices, such as ROADM (Reconfigurable Optical Add-Drop Multiplexer) or WSS (Wavelength-Selective Switch) devices or similar, in order to control and route the optical signals. Although discrete optical devices can be used to provide the same functionality, generally it is cheaper to utilise integrated devices for high channel-count WDM networks.

Autonomous rerouting of traffic is relatively well known in single-channel optical networks such as SDH (Synchronous Digital Hierarchy) where it is commonly known as ASTN (Automatically Switched Transport Network). In the more advanced versions of WDM networks, the network control software can also autonomously reroute traffic according to the demands on the network e.g. faults, changing bandwidth requirements etc, thus reducing the need for human intervention. Such a WDM network is commonly referred to as ASON (Automatically Switched Optical Network).

In general, signal regeneration using optical-electronic-optical conversion is not performed at every node, but only where necessary to restore signal quality. Hence, the routing and transmission of signals from node to node is generally performed in the optical domain.

It is desirable to control the power levels of each of the channels in an optical system. Optical signals experience wavelength dependent effects as they are transmitted across the network, including fibre and optical device attenuation, Raman scattering within the optical fibre, optical amplifier wavelength dependent gain etc. It is particularly desirable to control the optical signal power as channels are added to the network, to prevent disruption to existing established channels or radiation power surges which can interfere with existing channels e.g. due to the channels being amplified by non-linear devices such as erbium doped fibre amplifiers.

FIG. 1 is a schematic diagram of a device 10 suitable for use in an ASON node, for wavelength switching and control of optical power.

The device 10 comprises a port selector switch 12 which is operable to couple any one of a plurality of input ports 14a, 14b . . . 14m to a Variable Optical Attenuator (VOA) 16. The port selector switch 12 thus acts to select an optical signal path by switching to a particular port, thus directing an optical signal along a desired route through the network. The VOA 16 controls the power of the optical signal transmitted to the output port 18, keeping the channel power within an acceptable dynamic range.

In order to keep the optical signal within the acceptable dynamic range, the VOA 16 will be coupled to a controller 20. A power monitor function is provided at each node which continuously measures the individual channel powers at each line port (e.g. at line port 18). Such monitoring is usually carried out only after the VOA for cost reasons. The controller 20 determines an error signal based on the difference between the measured channel power and a target channel power (e.g. a transmission power level suitable for normal transmission of the optical channel within the network), with a fixed multiple of the determined error signal (the gain) then used to control the VOA attenuation. The controller 20 is often implemented as a cyclic control algorithm. Adjustments are made to the appropriate VOA attenuation at predetermined regular intervals. The period between one VOA update and the next is termed the control cycle.

FIG. 2 shows the typical progression of optical channel power at the output of a node, as a channel is introduced to the node. The horizontal axis shows time on an arbitrary scale and the vertical axis shows optical power on an arbitrary decibel (dB) scale.

At the beginning of the process (state A) the VOA 16 is at maximum attenuation (in the blocking state) causing the channel power at the output of the device (and hence the node) to be negligible. This is typically the quiescent state of the device, in order to minimise the transmission of optical noise power through the node. Such noise can be produced during optical amplification of signals at upstream nodes.

To introduce the channel, the VOA 16 is first adjusted to a predetermined "safe" value (state B in FIG. 2) in order to perform an initial calibration step. This step is necessary as the optical power is monitored only after the VOA 16, and therefore the channel power at the input to the VOA is unknown. If the input power of the optical signal supplied to the node was unexpectedly high and the VOA was subsequently set to a low attenuation, the resulting very high output power of the signal from the node could cause a disturbance to pre-existing channels along the channel route, and even damage the downstream optical detectors. Hence, this initial "safe" attenuation value of the VOA is chosen such that it results in an acceptably low channel output power after taking into account the various component tolerances and likely range of input powers. Once the VOA has been set to this "safe" attenuation value, the optical output power is measured in order to check that the input power is within an acceptable range to allow subsequent correct operation of the node.

Once the initial calibration step has been performed by reading the channel output power, the control loop algorithm is activated, and acts to reduce the VOA attenuation, producing the steps seen in time interval C in FIG. 2. Thus, the power of the channel gradually approaches the target output power, with the change in channel power for each step decreasing as the target channel power is approached, until the channel power at the node output substantially reaches the target channel power (i.e. state D). It will be seen that, in this case, the output power takes about 20 steps (i.e. about 20 control cycles) to move from the safe value (state B) to the target value (state D). Subsequently, the same control loop algorithm will act to control the VOA attenuation such that the optical power output is maintained at, or close to, the target channel power.

An optical channel will typically be transmitted along an optical link comprising several nodes. To prevent disruption to existing established channels or radiation power surges which can interfere with existing channels, a new channel will be iteratively introduced to each successive node. Once the channel power is substantially at the target channel power (i.e. state D in FIG. 2) at a node, then that node will transmit a signal to the next downstream node. The VOA at that downstream node will then start the process of introducing the channel at that downstream node. For example, the relevant signal indicating that a channel power at a node output has substantially reached the target channel power can be transmitted via the optical supervisory channel (OSC), using an "equipped wavelength table". The equipped wavelength table is data indicating which wavelength channels are fully present (i.e. at normal output power from a node). An update to the equipped wavelength table to indicate that a new channel is now fully present can also be termed a "channel present" message.

SUMMARY

In a first aspect, the present invention provides a method of controlling a variable optical attenuator. The method comprises receiving a signal indicative of an upstream variable optical attenuator having completed an initial calibration step, and initiating calibration of the variable optical attenuator in response to receipt of said signal.

Such a control system allows the optical attenuator to reduce the time taken for a channel to be introduced along an optical link, by performing the VOA calibration step whilst the upstream node is still introducing the optical channel. Previously, it had been believed that it was necessary for the channel to be fully introduced at each node before the next node downstream could introduce the channel, so as to maintain stability of the optical signal within acceptable limits, and prevent overall power instability in the network. However, the present inventor has realised that, once the initial calibration step has been performed by the upstream node, there is a high level of confidence that the channel will be successfully output at the desired power level from that upstream node, and hence the calibration of the downstream node can be initiated. Such a control system can thus improve the speed with which a chain of reconfigurable optical nodes can establish end-to-end transmission of an optical signal, providing a competitive advantage when employing ASON networks. Further, the corresponding relatively fast restoration of a link that can be provided by such a control system can be used to improve network resilience by quickly restoring back-up (e.g. protection) routes.

The step of initiating calibration of the variable optical attenuator may comprise providing a control signal to set the attenuation of the variable optical attenuator to a predetermined attenuation value, and receiving a signal indicative of the optical output power from the variable optical attenuator The step of initiating calibration of the variable optical attenuator may be performed prior to receipt of a signal indicative of said upstream variable optical attenuator having an optical output signal at a transmission power level.

The signal indicative of an upstream variable optical attenuator having completed an initial calibration step may be indicative of the attenuation of said variable optical attenuator having been set to a predetermined attenuation value, and an output optical signal from the variable optical attenuator having been measured to be within a predetermined power range whilst the upstream variable optical attenuator is at said predetermined attenuation.

The method may further comprise transmitting the signal from an upstream node including the variable optical attenuator indicative of the upstream variable optical attenuator having completed the initial calibration step.

The method may further comprise the steps:
(a) receiving a signal indicative of the radiation power of an optical signal output from the upstream variable optical attenuator having reached a transmission power level;
(b) receiving a signal indicative of the radiation power of an optical signal output from the variable optical attenuator;
(c) determining an error signal in dependence upon the received signal and a predetermined target radiation power level;
(d) determining a control signal for controlling the attenuation of the variable optical attenuator in dependence upon the error signal and a gain factor; and
(e) outputting the determined control signal for controlling the attenuation of the variable optical attenuator, wherein at least step (e) only occurs after step (a).

The method may further comprise repeating steps (b) to (e), wherein a first value of the gain factor is used during a first time period, and a second, lower value of the gain factor is used during a second time period.

The switch may be made to utilising the second value from utilising the first value once the error signal is indicative of the radiation power of the output optical signal being within a predetermined range of the target radiation power level.

In a second aspect, the present invention provides a method for control of a variable optical attenuator located in an optical link comprising a plurality of optical attenuators. The method comprises determining that an initial calibration step of a variable optical attenuator has been completed, and transmitting a signal indicative of the variable optical attenuator having completed the initial calibration step for receipt by a downstream variable optical attenuator.

Transmission of such a signal allows a downstream node to commence the initial calibration of a VOA at the downstream node, whilst the channel is still being introduced at the current node.

The step of determining that an initial calibration step has been completed may comprise determining that an output optical signal from the variable optical attenuator has been measured to be within a predetermined power range whilst the variable optical attenuator is at a predetermined attenuation value.

In a third aspect, the present invention provides a data carrier carrying computer readable instructions for controlling a processor to carry out the above method.

In a fourth aspect, the present invention provides a control system comprising a programme memory storing processor readable instructions, and a processor configured to read and execute instructions stored in said programme memory. The processor readable instructions comprise instructions for controlling the processor to carry out the above method.

The control system may comprise a processing element arranged to receive a signal indicative of an upstream variable optical attenuator having completed an initial calibration step, and initiate calibration of the variable optical attenuator in response to receipt of said signal.

The processor may be arranged to initiate calibration of the variable optical attenuator by providing a control signal to set the attenuation of the variable optical attenuator to a predetermined attenuation value, and to receive a signal indicative of the optical output power from the variable optical attenuator.

The processing element may be further arranged to determine whether the signal indicative of the optical output power from the variable optical attenuator lies within a predetermined power range, and transmit a signal indicative of the variable optical attenuator having completed an initial calibration step if the optical output signal power lies within said predetermined power range.

The processing element may be further arranged to
(a) receive a signal indicative of the radiation power of an optical signal output from the upstream variable optical attenuator having reached a transmission power level;
(b) receive a signal indicative of the radiation power of an optical signal output from the variable optical attenuator;
(c) determine an error signal in dependence upon the received signal and a predetermined target radiation power level;
(d) determine a control signal for controlling the attenuation of the variable optical attenuator in dependence upon the error signal and a gain factor;
(e) output the determined control signal for controlling the attenuation of the variable optical attenuator; and
(f) repeat steps (b) to (e).
A first value of the gain factor may be used during a first time period, and a second, lower value of the gain factor may be used during a second time period.

In a fifth aspect, the present invention provides a control system for a variable optical attenuator. The system comprises a processing element arranged to determine whether an initial calibration step of a variable optical attenuator has been completed, and transmit a signal indicative of the variable optical attenuator having completed the initial calibration step for receipt by a control system of a downstream variable optical attenuator.

In a sixth aspect, the present invention provides a device comprising at least one variable optical attenuator, and at least one control system as described above. Said at least one control system is coupled to said at least one variable optical attenuator for controlling the attenuation of said at least one variable optical attenuator.

The device may comprise a plurality of said variable optical attenuators, each arranged to controllably attenuate a different wavelength optical signal.

In a seventh aspect, the present invention provides an optical network comprising a plurality of nodes, with each of said nodes comprising at least one device as described above.

BRIEF DESCRIPTION OF THE DRAWINGS

Preferred embodiments of the present invention will now be described, by way of example only, with reference to the accompanying drawings, in which.

DETAILED DESCRIPTION

Figure 1:
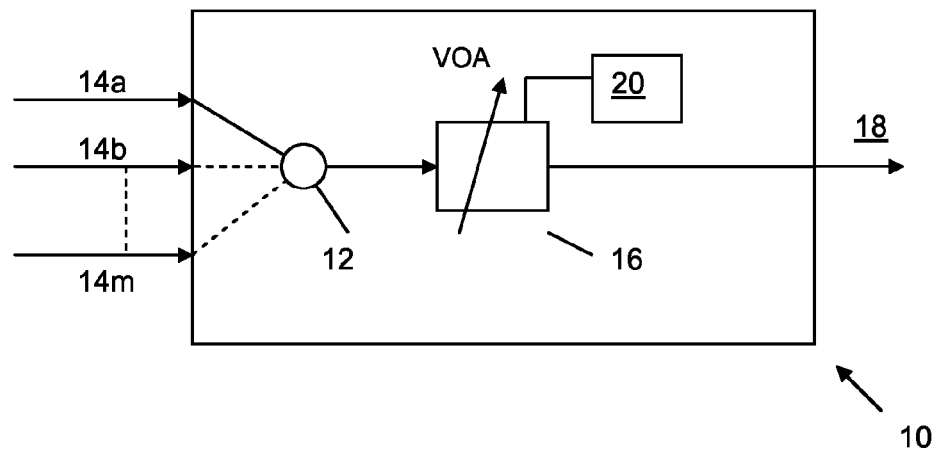
FIG. 1 is a schematic diagram of a known Wavelength Selective Switch device comprising a selector switch coupled to a Variable Optical Attenuator (VOA) for power control.
Figure 2:
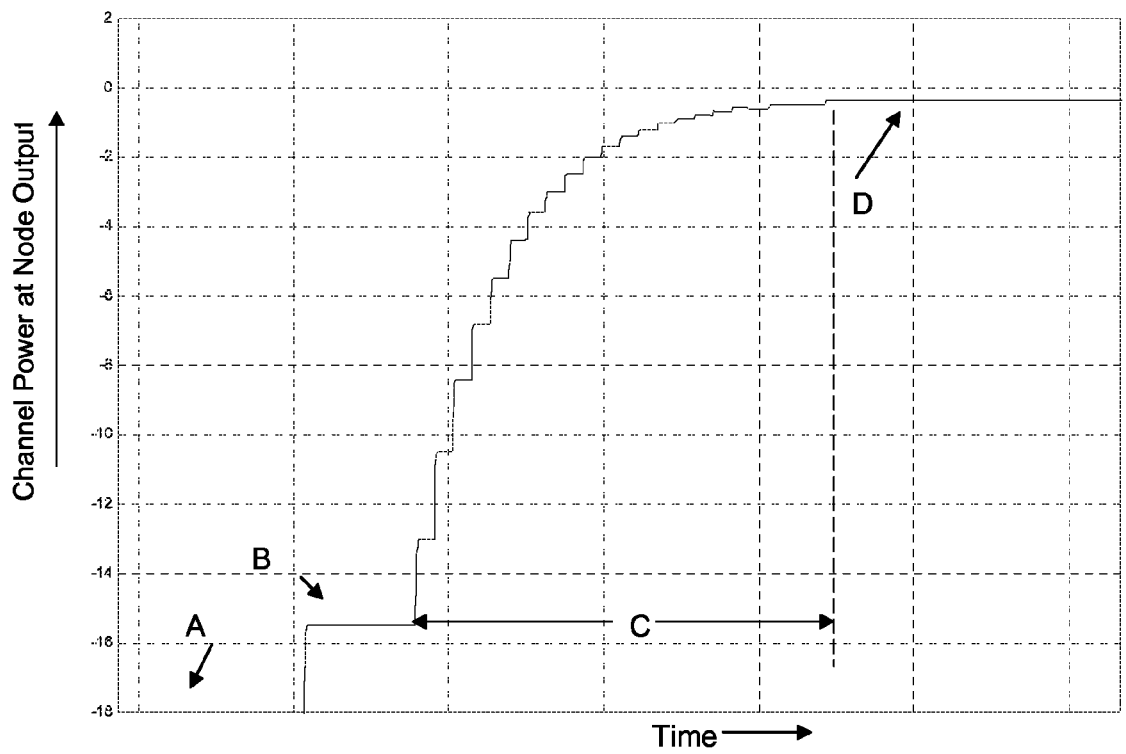
FIG. 2 is a graph of optical output power as a function of time as a channel is introduced to the device illustrated in FIG. 1 using a known technique.

It is known for the network control software to autonomously re-route traffic according to the demands on the network e.g. faults, changing bandwidth requirements etc. For example, it is desirable to restore an end-to-end optical link after a fault in the network, by the creation of a new traffic path along a route which has not been affected by the fault. The faster this re-routing can be performed, the more quickly network traffic and/or resilience can be restored.

The present inventor has appreciated that new challenges are presented by the use of reconfigurable optical devices as may be used within photonic nodes.

For example, in many existing ASTN networks (i.e. non-WDM networks) the time to perform traffic restoration is limited chiefly by the speed of operation of ASTN management software, as the associated electronic switching hardware has much lower reconfiguration times. The general expectation is that when the equivalent functionality is deployed in WDM networks (e.g. to realise ASON), the operation times will be similar. However, the present inventor has appreciated that this is not likely to be the case.

In particular, the present inventor has realised that the reconfigurable optical devices used within photonic nodes cannot generally operate in the same time scales as the electronic equivalents used in single-channel systems. The time taken for such reconfigurable optical devices to perform optical switching (changing the routing of a signal from one port to another) and also the introduction of optical channels, including, optical "levelling" (changing the channel attenuation to adjust the optical output power of a channel to a desired target level), are limited by the optical response times of the technology used and/or the necessary data processing within the device. Thus, the time delay between channel power updates (i.e. the "control cycle" used by the controller) must be relatively long.

For example, typically a control cycle for a controller in a photonic node would be of the order of hundreds of milliseconds, which in turn affects the time taken to introduce a channel at each node. As a link will require the introduction of a channel at a number of nodes, and as each channel must be sequentially introduced to each node before being introduced to the next node in the link, the introduction of channels along a chain of nodes using the prior art method can be unacceptably long (e.g. many seconds).

The present inventor has appreciated that the time taken to introduce a channel to a chain of nodes (e.g. to an optical link) can be reduced by partially overlapping the channel introduction procedures at successive nodes.

Accepted practice is that it is undesirable to overlap the channel introduction process, as that can lead instability of the power level of the optical signal, leading to overall power instability in the network. However, the present inventor has realised that, once the initial calibration step has been performed by a VOA in a node, there is a high level of confidence that the channel will be successfully output at the desired power level from that node, and hence the calibration of the next node in the link can be initiated.

Preferably, to further reduce the time taken to introduce the channel at each node, the control system for the variable optical attenuator at each node utilises at least two gain values. A first (e.g. relatively high) gain value is used to ensure that the initial step-size (used after the calibration procedure) is relatively high, so that the VOA relatively rapidly approaches the target radiation power level (e.g. the transmission power level, which is a power level suitable for normal transmission of the optical channel within the network).

To prevent instabilities which might arise if the first gain value were consistently used along a chain of similar nodes, which could lead to a degradation in the performance of the traffic path (bit errors or complete loss of signal, or even disturbances on other optical channels due to dynamic range effects within optical amplifiers), a second, lower value of the gain factor is subsequently used e.g. after a predetermined time period. The predetermined time period could be a predetermined number of control cycles, or once the optical output power level has reached a predetermined level e.g. after the error signal indicative of the difference between the target radiation power and the optical output power of the VOA has dropped to beneath a predetermined level.

Such a control system can thus improve the speed with which a chain of reconfigurable optical nodes can establish end-to-end transmission of an optical signal, providing a competitive advantage when employing ASON networks. Further, the corresponding relatively fast restoration of a link that can be provided by such a control system can be used to improve network resilience by quickly restoring back-up (e.g. protection) routes.

An overview of the channel introduction procedure in accordance with an embodiment of the present invention will now be described with reference to FIGS. 3 & 4, with more detail subsequently provided with reference to FIGS. 5-7.

Figure 3:
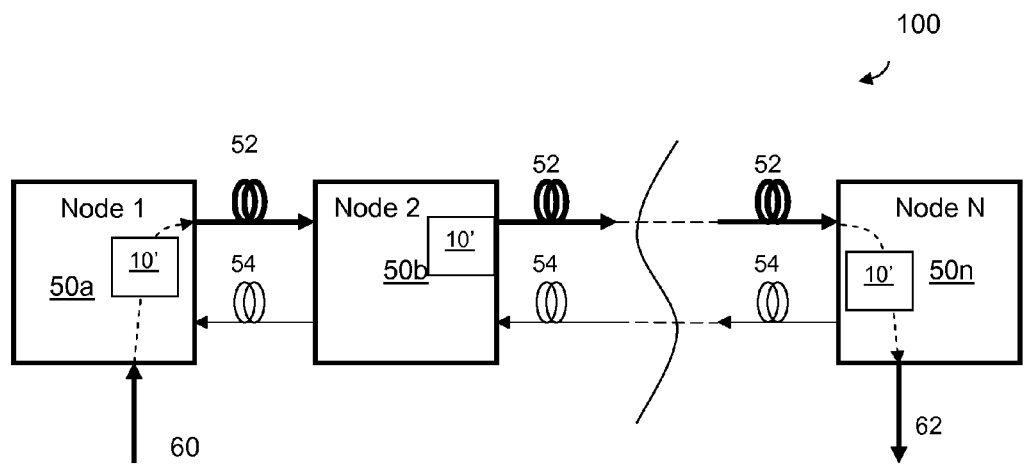
FIG. 3 is a schematic diagram illustrating an optical network comprising a plurality of nodes in which power control is performed in accordance with an embodiment of the present invention.

FIG. 3 is a schematic diagram of an optical mesh network 100, in which only the nodes (50a, 50b . . . 50n) are illustrated that form a link (a route through the mesh network) for a particular single channel. Each of the optical nodes is reconfigurable, and every node includes at least one wavelength selective switch, or apparatus that provides a similar function. Due to the connections made by the wavelength selective switches, the link for the particular single channel (e.g. an optical signal of predetermined wavelength) comprises a serial concatenation of the optical nodes. In this particular example, each node comprises a device 10' for performing routing (and levelling i.e. the VOA within each node is controlled so as to keep the optical power of the channel within acceptable performance limits).

Each node is connected to an adjacent node by one or more respective spans of optical fibre (52, 54). Only the particular optical channel transmitted in the desired traffic direction (along fibre spans 52, from node 50a to destination node 50n) is considered here. The reverse traffic direction (i.e. signals transmitted along optical fibre spans 54) is not considered, and nor are any other wavelength signals (e.g. channels) which may also be transmitted along the same fibre spans 52.

The initial optical signal 60 is input to the first node 50a, and transmitted through each of the adjacent nodes to the destination node 50n, at which it leaves the reconfigurable network as an output signal 62.

Figure 4:
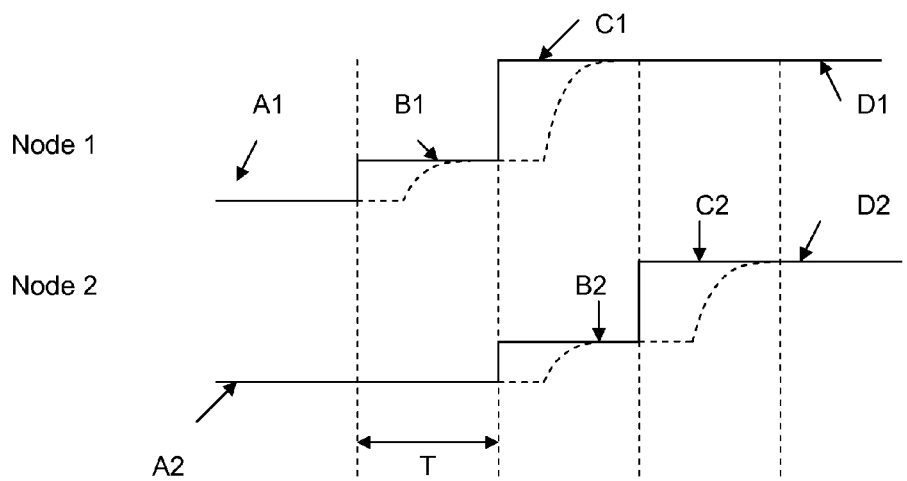
FIG. 4 is a graph illustrating the optical output signal power as a function of time for VOAs within nodes 1 & 2 of FIG. 3.

FIG. 4 illustrates this introduction procedure, by indicating the optical output powers corresponding to the VOA attenuation control settings (solid lines) and the subsequent actual optical output power response (dotted lines) for the first and second nodes (50a, 50b) in the network 100 of FIG. 3.

The time period T represents the control cycle period. The states A1, A2 represent the relevant VOA being in the blocking (maximum attenuation) state, with states B1, B2 representing the respective VOA being in an initial calibration state, and C1, C2 representing the respective VOA receiving a control signal to reach the desired, target output power. The states D1, D2 indicate the output power of the VOA having reached a suitable transmission power level.

It can be seen that the initial calibration step (B2) of the VOA at node 2 advantageously takes place at the same time as the levelling step (C1) of the VOA of node 1. This overlap can occur by the controller of the VOA at node 1 making a power measurement at the end of the calibration step time period, to determine whether the optical channel power at that VOA output is within acceptable limits whilst the VOA is set to a predetermined ('safe') value of attenuation.

If the optical output power from the VOA of node 1 is determined as being within a predetermined power range, then the VOA calibration step has been successfully completed, and the controller of node 1 will transmit a first signal to node 2, indicative of the node 1 VOA having successfully completed its calibration step. This first signal is an additional message type, and could take the form of an instruction to the downstream node (node 2 in this example) to begin its calibration. Should a signal could be transmitted using the Optical Supervisory Channel (OSC).

It should be noted that this first signal does not indicate that the output channel power is actually correct (e.g. at a power level suitable for transmission of the optical channel) at the originating (upstream) node.

Instead, the check of the optical output power being within a predetermined, acceptable output range, allows the prediction to be made that the VOA of node 1 will be able to output an optical signal at its target power (e.g. a transmission power level), given the known dynamic range of the VOA and the measured optical power at a predetermined attenuation value. Therefore, the present inventor has realised, there is no need to wait until the levelling step (i.e. C1) has completed before initiating the setting of the next node's VOA to its 'safe' calibration value.

Upon receipt of that first signal indicative of the upstream VOA having successfully completed its calibration step, the controller of the downstream node (node 2) VOA begins its own calibration step (B2) i.e. sends a signal to the VOA to set a predetermined (safe) attenuation value. At the same time, the upstream node VOA that has sent the first signal (node 1) begins its levelling step(s) C1.

It should be noted that it is not usually desirable to set all of the VOAs in the link to the predetermined ("safe") attenuation value to circumvent the calibration step, because of the build up of optical noise which may then ensue along the link.

In the example shown in FIG. 4, a high first value gain (e.g. unity) is used in the control loop used for the levelling procedure, such that only a single levelling step is required for the levelling procedure (steps C1, C2). In such an implementation, only one power measurement will typically be required for confirmation of the calibration and then setting the VOA in the ensuing levelling step. Further, the introduction of the channel at the node takes only two control cycles (rather than using the greater number of control cycles required by the prior art method), including the calibration step.

Once the output power from the VOA at node 1 reaches the target power level (e.g. a transmission power level, state D1), a second signal can be sent to the downstream node to indicate this, e.g. using the OSC.

For example, correct channel power can be indicated by subsequent transmission of the original "channel present" message type using the OSC. Provided the OSC message transmission is fast enough, lack of this second message can be used to cause the channel introduction at the downstream node (node 2) to be delayed or aborted in cases where correct channel power cannot be achieved even after a successful calibration stage at the upstream node, e.g. node 2 only commences step C2 (the levelling step), once a signal indicative of the optical signal output from the VOA at node 1 being at a suitable transmission power level has been received.

This "channel present" signal would normally be passed on once it is deemed that the first time period has passed, and as the control loop gain factor in node 1 is therefore reduced to a second, lower value for stability.

Thus, the next node in the link will begin introducing the channel (the levelling step, C2) as the gain factor of the present node is set to the second, lower value (i.e. in step D1), thus reducing the likelihood of instability in the link. Further, in this way, at any given time, no more than one node in the link will be working at the higher, first gain value.

Preferably, the time taken for the optical power monitoring procedure is small compared to the response of the device to attenuation changes, with the power measurement typically occurring towards the end of each control cycle. If this is not the case it may not be possible to overlap the calibration step of the downstream node VOA with the levelling step of the upstream VOA by a complete control cycle. However, improvements can still be realised, by overlapping the processes by as long a time as is possible, activating the downstream process (e.g. calibration step) as soon as it is known that the target power will be achieved at the upstream node by the time that the power measurement is made during the calibration step of the downstream node.

The above procedure is preferably iteratively repeated at each node (e.g. with node 2, once the calibration step has been successfully completed, sending a first signal to the next downstream node, to allow that downstream node to start the calibration procedure etc), thus overlapping the channel introduction process as much as possible over the optical link.

Figure 5:
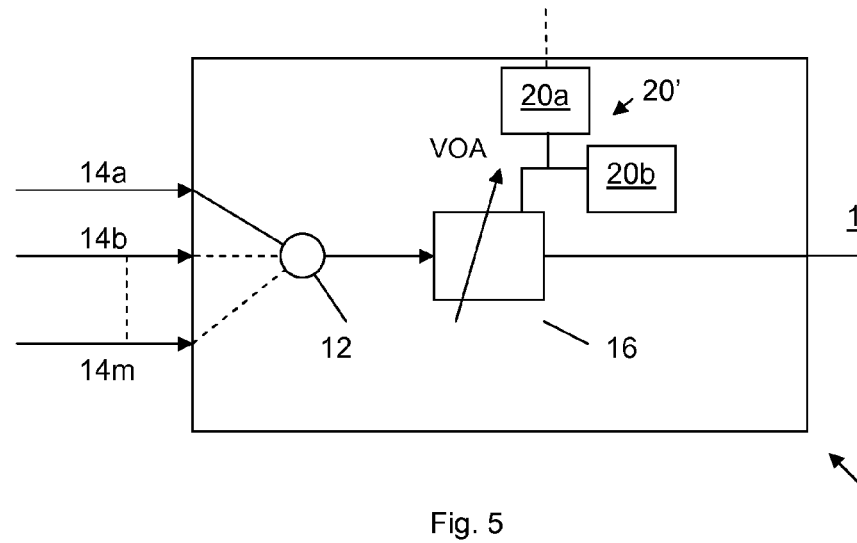
FIG. 5 is a schematic diagram of a Wavelength Selective Switch device comprising a selector switch coupled to a VOA, with an associated controller in accordance with an embodiment of the present invention.

FIG. 5 is a schematic diagram of a device 10' suitable for implementing the above technique. This particular device 10' is for use in an ASON node, for wavelength switching and control of optical power.

For clarity, only a single wavelength path is shown i.e. this architecture would be replicated for each separate wavelength. Typically, 40 or 80 wavelength channels may be provided, each with a corresponding device 10'. Optical amplification and other functions may also be provided by the node by known devices, but the relevant devices are not illustrated here. For ease of an explanation, identical reference numerals are used to represent similar features throughout the figures.

It will be seen that the device 10' illustrated at FIG. 5 is of generally similar architecture to the device 10 illustrated in FIG. 1. The device 10' comprises a port selector switch 12, which is operable to couple any one of a plurality of input ports 14a, 14b ... 14m to a VOA 16. Each of the input ports can be coupled to a different optical signal path. The switch 12 thus acts to select the relevant optical signal path for onward transmission by the device, by switching to a particular port. The attenuation of the VOA 16 is controlled so as to control the power of the optical signal transmitted to the output port 18 of the device 10'. The VOA 16 is coupled to a controller 20', which provides a control signal to control the attenuation of the VOA 16, so as to keep the channel power within an acceptable dynamic range.

In a typical node, such a device 10' would be used at every line port in the transmit and/or receive direction depending on the node architecture. The transmit architecture is shown (i.e. with a plurality of selectable inputs, and a single output). The receive architecture by contrast comprises a single input port, and a plurality of selectable output ports. Both transmit and receive architectures would include a variable optical attenuator, for controlling the power of the optical signal transmitted through the device 10', and a corresponding controller 20'.

FIG. 5 shows the controller 20' can be regarded as being formed of two functional portions 20a, 20b. Functional portion 20a is arranged to receive the first and second signals from an upstream node (e.g. indicative of the VOA in the upstream node having respectively completed an initial calibration step, and having an optical output signal at a suitable transmission power level), and to transmit corresponding first and second signals to a downstream node. Functional portion 20b provides a control loop for use in the levelling step (e.g. steps C1, C2) and subsequent control of the channel transmission power (D1, D2), and is described in more detail below with reference to FIG. 6.

For transmission and receipt of such signals, the portion 20a can be functionally coupled to a portion (or portions) of the node that transmit & receive the OSC. Functional portion 20a is arranged to initiate calibration of the VOA in response to receipt of the first signal, and to initiate operation of the control loop of the second portion in response to receipt of the second signal from the upstream node. Functional portion 20a is arranged to determine (e.g. by making a measurement of the output power level from the VOA) once the VOA 16 has successfully completed a calibration step, and to output a first signal for the downstream node. Functional portion 20a is similarly arranged to determine (e.g. again, from the optical output power, or alternatively by receiving a relevant signal from portion 20b) once the optical power output from the VOA 16 is at a suitable transmission level, and to then output a second signal for receipt by the downstream node.

Figure 6:
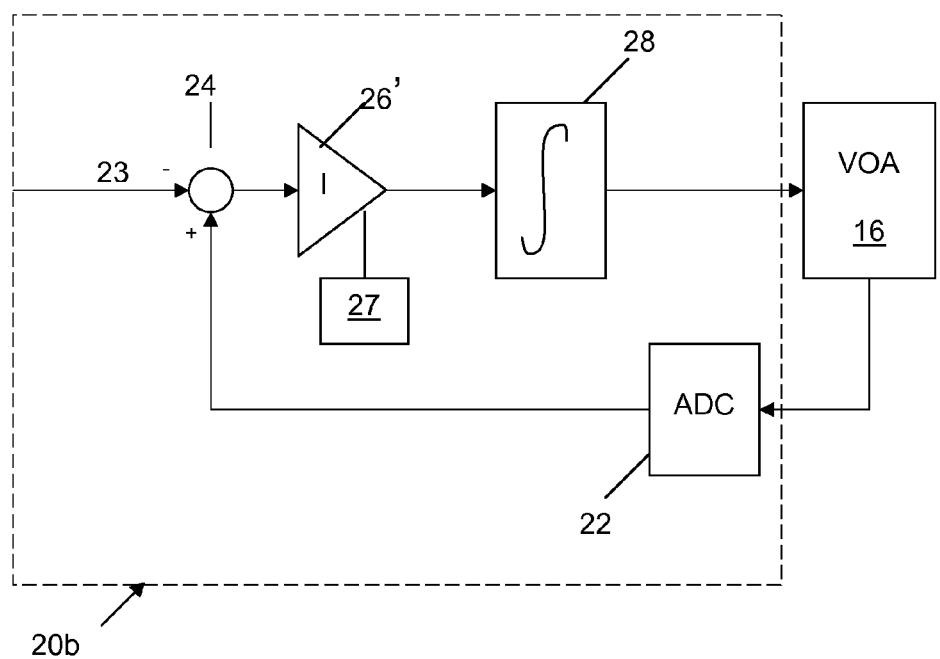
FIG. 6 is a schematic diagram illustrating a control algorithm suitable for use in the controller illustrated in FIG. 5, in accordance with an embodiment of the present invention.
Figure 7:
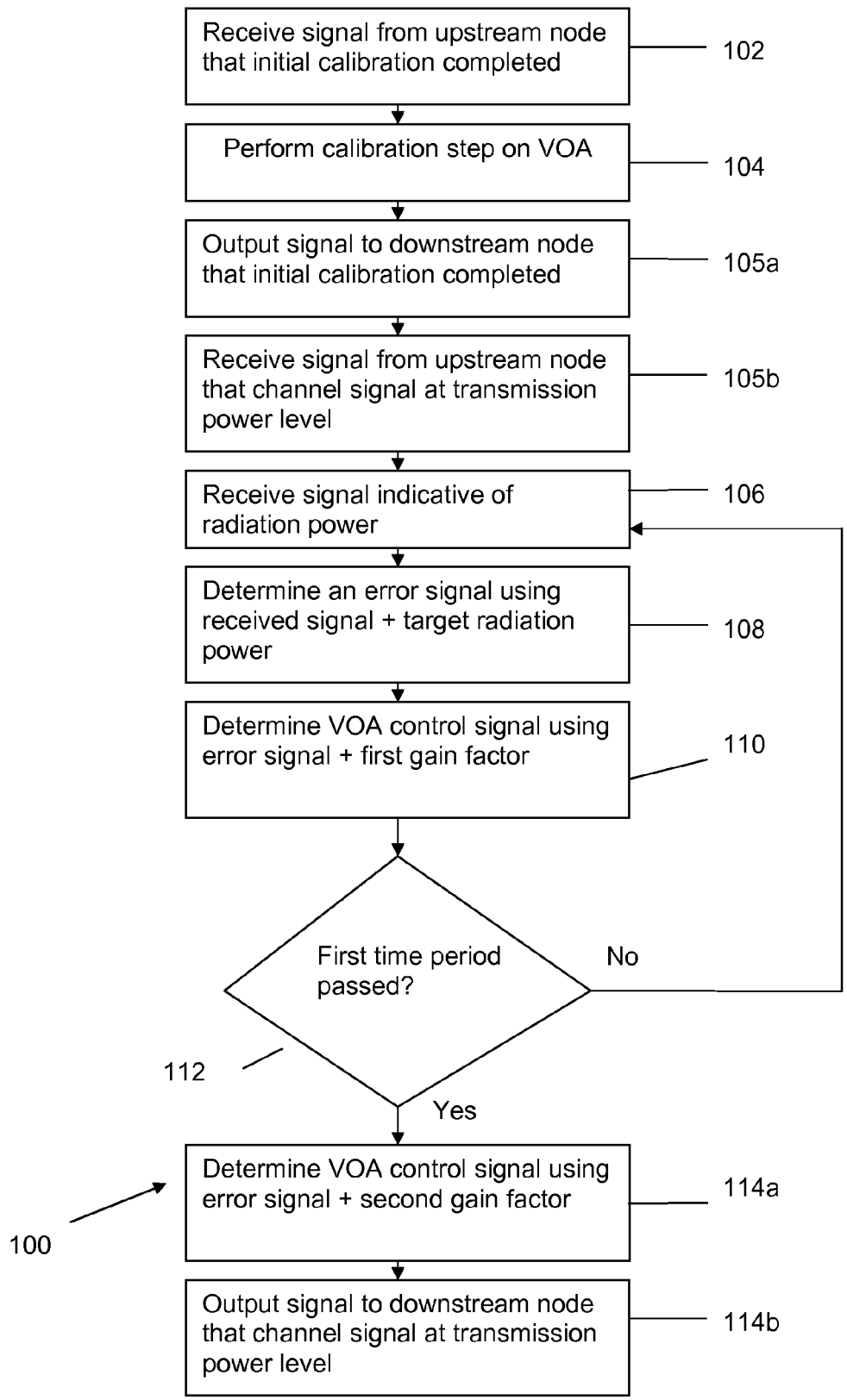
FIG. 7 is a flow chart illustrating a method in accordance with an embodiment of the present invention.

FIG. 6 is a schematic diagram showing the particular functional blocks provided by the controller portion 20b for levelling i.e. for implementing the control loop algorithm described above with respect to state C1 of FIG. 4. During the levelling step(s), the controller 20b provides a closed-loop control of the attenuation of the VOA 16 (and hence the power of the optical signal being transmitted through the device 10'). One difference between the prior art controller 20 and the controller 20' is that the controller 20' alters the gain of the feedback loop with time. As will be explained in more detail below, this change in gain allows an initial relatively fast change in the power of the output optical signal as a function of time, to allow the output optical signal to reach a predetermined target radiation power level during the levelling step(s). Subsequently, the use of a different gain value maintains the stability of the optical signal within acceptable limits, and prevents any overall power instability that might arise if the initial gain factor were maintained.

The controller portion 20b includes a power monitor element (22) which continuously (or periodically) measures the individual channel power. In the particular embodiment shown in FIG. 6, the channel power is sampled by an analogue to digital converter 22.

The output of the ADC 22 is a signal indicative of the radiation power of the optical signal output from the variable optical attenuator.

An error signal is then determined in dependence upon the signal indicative of the radiation power of the output optical signal and a predetermined target radiation power level. The target radiation power level is the desired optical signal output power. Such a predetermined target radiation power level may be set by the network management.

In the implementation shown in FIG. 6, the error signal is generated by determining the difference between the signal indicative of the radiation power of the output optical signal and a signal 23 indicative of the predetermined target radiation power level. In particular, the summing point 24 determines the error signal by subtracting the signal 23 indicative of the predetermined target radiation power level from the signal indicative of the actual radiation power of the output optical signal.

The error signal is subsequently scaled in dependence upon a gain factor by integral functional element 26'. The gain factor is a multiplication factor, and is used to determine the gain of the control loop. In the example implementation shown in FIG. 6, the product of the error signal with the gain factor determines the step size i.e. the increment or decrement in attenuation of the VOA that is required for the optical signal output power to approach the target radiation power level. Once every predetermined time interval, corresponding to a cycle of the control loop, the calculated step-size is added to the accumulator 28, the output of which represents the current value of VOA attenuation. The output of the accumulator 28 is thus provided to the VOA 16 as a control signal to control the attenuation of the VOA 16.

The controller portion 20b is arranged to iteratively repeat the steps of receiving the signal indicative of the radiation power of the optical output signal from the VOA, determine an error signal, and determine the control signal for controlling the attenuation of the VOA 16.

Element 27 in FIG. 6, which is coupled to the integral term 26', is shown as providing an input to the integral term, to vary the gain factor used by the integral term.

The operation of the controller will now be described with respect to FIG. 7 (which shows a flow chart of a method followed by the device 10' including the controller 20').

Typically, when no optical channel signal is provided to the device 10', the VOA 16 will be set to maximum attenuation, to prevent the onward transmission of noise. This maximum attenuation state (A1 or A2) is shown in FIG. 4, with the channel power at the node output being at the lowest level. Thus, the VOA 16 is in its "blocking" state.

In step 102, a first signal is received at the node, from an upstream node, indicative that the relevant VOA of the upstream node has successfully completed an initial calibration step. This signal may be used to indicate that a channel is being introduced along the optical link containing both the present node and the upstream node. The channel may be introduced to the link due to the provisioning of a new route through the node, or the restoration of a link through the node.

A calibration of the VOA 16 at the present node is then initiated, with the attenuation of the VOA 16 set to a predetermined "safe" attenuation level that allows the measurement of the optical output power from the VOA for calibration purposes, and the optical output power measured (step 104).

Assuming the output power from the VOA is measured as being within a predetermined range (i.e. indicative that it is possible for the transmission power level to be reached), then the calibration step 104 is deemed to have been completed. Once the calibration step 104 has been completed, a first signal is output from the node, for receipt by a downstream node, indicative that the initial VOA calibration has been completed (step 105a). Also, once the calibration step 104 has been completed, the node waits for receipt of a second signal from the upstream node, indicative of the optical output signal from the relevant VOA (e.g. the channel power) being at a suitable transmission power level (step 105b). Steps 105a and 105b can be performed in either order, or simultaneously.

Once the second signal has been received (step 105b), the control loop for the levelling operation will begin (steps 106-112). The controller will receive a signal indicative of the output radiation power (step 106). In the first iteration of step 106, this signal could simply be the power measurement of the VOA output power made during the calibration step 104, although in later iterations of step 106, new power measurements will be made of the optical output power.

Subsequently, the error signal is determined using the received signal indicative of the output signal power and a signal indicative of the target radiation power (step 108).

The control signal to set the attenuation of the VOA 16 is then calculated from the error signal, using a first gain value or factor (step 110). This first gain value is relatively high e.g. in the example shown in FIG. 4, the gain value is one (unity), such that in a single control cycle (e.g. state C2) the attenuation of the VOA is set such that the optical output power is substantially at the target radiation power level, due to the high loop gain used during the cycle. Thus, the transition from the quiescent, blocking state (state A2) to the desired channel output power (state D2) occurs in two control cycles, with one control cycle corresponding to the initial calibration step (state B2).

After the VOA control signal calculated using the error signal and first gain factor has been output to the VOA 16, it is determined whether the first time period has passed (step 112).

Whether the first time period has passed (in which the first, relatively high, gain value is utilised) can be determined in any one or more of a number of ways. It can be determined based upon a predetermined number of control cycles having passed, with that predetermined number depending upon the value of the first gain factor e.g. the higher the gain factor, the fewer control cycles that will be required. Alternatively, whether the first time period has passed could be determined from measuring the optical output power from the VOA 16 and/or the device 10', and determining whether that optical output power is within a predetermined range of the target radiation power (e.g. the desired transmission power level of the channel).

If the first time period has deemed not to have passed (e.g. not enough control cycles have passed, and/or the output power is not within a predetermined range of the target radiation power), then the control cycle (steps 106-112) is repeated, until the first time period is deemed to have passed.

Subsequently, the gain factor used by the control loop is altered, and subsequent VOA control signals are generated using the second, lower gain value or factor (step 114a). In other words, the control loop gain is reduced to a typical, normal working level (e.g. with the second gain value being less than a third of the value of the first gain value e.g. with the second gain factor being 0.2). The value of the second gain factor may depend upon the number of downstream nodes through which the channel will be transmitted, and can be selected such that the concatenated control loops of all of the downstream nodes do not produce instability in the signal power.

Additionally, once the first time period is deemed to have passed, a second signal is output for receipt by the downstream node, indicative of the VOA having an optical output signal at a suitable transmission power level (step 114b). Steps 114a & 114b can occur in either order, or simultaneously.

It shall be appreciated that the above embodiments of the present invention have been described by way of example only, and various alternatives will be apparent to the skilled person as falling within the scope of the claims.

Whilst FIG. 5 illustrates the controller 20' as comprising two functional portions, it should be appreciated that this is for ease of explanation only, and that the controller can be implemented as a single physical unit, or multiple physical portions. The controller can be implemented using any appropriate processing element, including a dedicated circuit, a dedicated microprocessor, or a microprocessor which performs other functions. The processing element may be implemented using digital or analogue electronics or electrical circuits. The instructions for performing the relevant functional blocks of the control loop provided by the controller may be hard wired into the processing element, or may be provided as processor readable instructions stored in a programme memory or on a data carrier.

Whilst the above embodiments have been described as using two gain values or factors, it should be appreciated that the present invention could be implemented using three or more gain values e.g. with a first, relatively high gain value used in a first time period, a second, intermediate gain value used in a second time period, and a third, lowest gain value used in a third time period.

Thus, from the above description, it will be readily appreciated that an introduction of a channel in a chain of nodes using a method in accordance with an embodiment of the present invention can greatly increase the speed with which the channel is introduced to the chain, allowing a network to establish end-to-end transmission of an optical signal much more quickly than prior art methods.

The invention claimed is:

1. A method of controlling a variable optical attenuator in a node connected to an optical network to attenuate an optical channel in order to adjust an optical output power level of the optical channel output from the node to a desired transmission power level for the optical channel, the method comprising:
   receiving a signal indicative of an upstream variable optical attenuator having completed an initial calibration; and
   initiating a calibration of the variable optical attenuator in response to the receiving of said signal,
   wherein the calibration sets the variable optical attenuator to an attenuation value such that a level of an optical output power of the optical channel output from the node after the calibration is less than the desired transmission power level.

2. A method as claimed in claim 1, wherein initiating the calibration of the variable optical attenuator comprises providing a control signal to set the attenuation of the variable optical attenuator to the attenuation value, and receiving a signal indicative of the optical output power from the variable optical attenuator.

3. A method as claimed in claim 1, wherein initiating the calibration of the variable optical attenuator is performed prior to receipt of a signal indicative of said upstream variable optical attenuator being currently calibrated to output an optical output signal at the desired transmission power level.

4. A method as claimed in claim 1, wherein the signal indicative of an upstream variable optical attenuator having completed an initial calibration is indicative of the attenuation of said upstream variable optical attenuator having been set to the attenuation value, and an output optical signal from the upstream variable optical attenuator having been measured to be within a predetermined power range while the upstream variable optical attenuator is at said attenuation value.

5. A method as claimed in claim 1, further comprising transmitting the signal from an upstream node including the variable optical attenuator indicative of the upstream variable optical attenuator having completed the initial calibration.

6. A method as claimed in claim 1, further comprising:
   (a) receiving a signal indicative of the radiation power of an optical signal output from the upstream variable optical attenuator having reached the desired transmission power level;
   (b) receiving a signal indicative of the radiation power of an optical signal output from the variable optical attenuator;
   (c) determining an error signal in dependence upon the received signal and a predetermined target radiation power level;
   (d) determining a control signal for controlling the attenuation of the variable optical attenuator in dependence upon the error signal and a gain factor; and
   (e) outputting the determined control signal for controlling the attenuation of the variable optical attenuator,
   wherein at least (e) only occurs after (a).

7. A method as claimed in claim 6, further comprising repeating (b) to (e), wherein a first value of the gain factor is used during a first time period, and a second, lower value of the gain factor is used during a second time period.

8. A method as claimed in claim 7, wherein the switch is made to utilizing the second value from utilizing the first value once the error signal is indicative of the radiation power of the output optical signal being within a predetermined range of the target radiation power level.

9. A method for control of a variable optical attenuator located in an optical link comprising a plurality of optical attenuators associated with an optical channel, the method comprising:
   determining that an initial calibration of a variable optical attenuator has been completed, the initial calibration setting the variable optical attenuator to an attenuation value such that a level of an optical output power of an optical channel output from a node that includes the variable optical attenuator after the calibration is less than a desired transmission power level of the optical channel; and
   transmitting a signal indicative of the variable optical attenuator having completed the initial calibration for receipt by a downstream variable optical attenuator.

10. A method as claimed in claim 9, wherein the determining that an initial calibration has been completed comprises:

determining that an output optical signal from the variable optical attenuator has been measured to be within a predetermined power range while the variable optical attenuator is at the attenuation value.

11. A non-transitory computer readable medium having instructions stored therein, that when executed by a processor, causes the processor to carry out the method of claim 1.

12. A control system comprising:
   a program memory storing processor-readable instructions; and
   a processor configured to read and execute the processor-readable instructions stored in said programme memory,
   wherein, upon being executed by said processor, the processor-readable instructions cause the processor to carry out the method of claim 1.

13. A control system for a variable optical attenuator to attenuate an optical channel, the control system comprising a processing element configured to:
   receive a signal indicative of an upstream variable optical attenuator having completed an initial calibration; and
   initiate calibration of the variable optical attenuator in response to receipt of said signal,
   wherein the calibration sets the variable optical attenuator to a attenuation value such that a level of an optical output power of an optical channel output from the variable optical attenuator after the calibration is less than a desired transmission power level of the optical channel.

14. A control system as claimed in claim 13, wherein the processor is configured to initiate calibration of the variable optical attenuator by providing a control signal to set the attenuation of the variable optical attenuator to the attenuation value, and to receive a signal indicative of the optical output power from the variable optical attenuator.

15. A control system as claimed in claim 14, wherein the processing element is further configured to:
   determine whether the signal indicative of the optical output power from the variable optical attenuator lies within a predetermined power range; and
   transmit a signal indicative of the variable optical attenuator having completed an initial calibration if the optical output signal power lies within said predetermined power range.

16. A control system as claimed in claim 13, wherein the processing element is further configured to:

(a) receive a signal indicative of the radiation power of an optical signal output from the upstream variable optical attenuator having reached the desired transmission power level;
(b) receive a signal indicative of the radiation power of an optical signal output from the variable optical attenuator;
(c) determine an error signal in dependence upon the received signal and a predetermined target radiation power level;
(d) determine a control signal for controlling the attenuation of the variable optical attenuator in dependence upon the error signal and a gain factor;
(e) output the determined control signal for controlling the attenuation of the variable optical attenuator; and
(f) repeat (b) to (e),
wherein a first value of the gain factor is used during a first time period, and a second, lower value of the gain factor is used during a second time period.

17. A control system, in a node connected to an optical network, for a variable optical attenuator associated with an optical channel, the system comprising a processing element configured to:
   determine whether an initial calibration of a variable optical attenuator has been completed, the calibration setting the variable optical attenuator to a attenuation value such that a level of an optical output power of the variable optical attenuator after the calibration is less than a desired transmission power level of the optical channel output from the node; and
   transmit a signal indicative of the variable optical attenuator having completed the initial calibration for receipt by a control system of a downstream variable optical attenuator.

18. A device comprising at least one variable optical attenuator, and at least one control system as claimed in claim 13, wherein said at least one control system is coupled to said at least one variable optical attenuator for controlling the attenuation of said at least one variable optical attenuator.

19. A device as claimed in claim 18, wherein the device comprises a plurality of said variable optical attenuators, each arranged to controllably attenuate a different wavelength optical signal.

20. An optical network comprising a plurality of nodes, with each of said nodes comprising at least one device as claimed in claim 18.

* * * * *

UNITED STATES PATENT AND TRADEMARK OFFICE
CERTIFICATE OF CORRECTION

PATENT NO. : 8,855,500 B2  Page 1 of 1
APPLICATION NO. : 13/121274
DATED : October 7, 2014
INVENTOR(S) : Callan It is certified that error appears in the above-identified patent and that said Letters Patent is hereby corrected as shown below:

On the Title Page, in item (73), under "Assignee", in Column 1, Line 2,
delete "Stockholm" and insert -- (publ), Stockholm --, therefor.

Signed and Sealed this
Fifth Day of May, 2015

Michelle K. Lee
*Director of the United States Patent and Trademark Office*